(12) United States Patent
Asai et al.

(10) Patent No.: US 8,632,313 B2
(45) Date of Patent: Jan. 21, 2014

(54) TURBINE ROTOR BLADE

(75) Inventors: Kunio Asai, Hitachi (JP); Takeshi Kudo, Hitachinaka (JP); Hideo Yoda, Hitachi (JP); Katsumi Tanaka, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 688 days.

(21) Appl. No.: 12/821,460

(22) Filed: Jun. 23, 2010

(65) Prior Publication Data

US 2010/0329884 A1 Dec. 30, 2010

(30) Foreign Application Priority Data

Jun. 25, 2009 (JP) ................................. 2009-150443

(51) Int. Cl.
*F01D 5/14* (2006.01)
(52) U.S. Cl.
USPC .................................. 416/241 R; 416/223 R
(58) Field of Classification Search
USPC .............. 416/223 R, 224, 228, 241 A, 241 B, 416/241 R
See application file for complete search history.

(56) References Cited

U.S. PATENT DOCUMENTS

| | | | | |
|---|---|---|---|---|
| 4,832,252 | A | * | 5/1989 | Fraser ............................ 228/119 |
| 5,062,205 | A | * | 11/1991 | Fraser ........................... 29/889.7 |
| 5,067,234 | A | * | 11/1991 | Fraser ........................... 29/889.1 |
| 2006/0118215 | A1 | | 6/2006 | Hirakawa et al. |
| 2010/0329884 | A1 | * | 12/2010 | Asai et al. ................. 416/241 R |

FOREIGN PATENT DOCUMENTS

| | | |
|---|---|---|
| DE | 2 215 240 | 9/1973 |
| EP | 0 507 131 | 10/1992 |
| GB | 1 233 730 | 5/1971 |
| GB | 2 198 667 | 6/1988 |
| GB | 2 397 544 | 7/2004 |
| JP | 54-77806 | 6/1979 |
| JP | 55134702 A * | 10/1980 |
| JP | 56-033432 | 4/1981 |
| JP | 61079802 A * | 4/1986 |
| JP | 62180051 A * | 8/1987 |
| JP | 63198703 A * | 8/1988 |
| JP | 63-263204 | 10/1988 |
| JP | 02040003 A * | 2/1990 |
| JP | 06-173604 | 6/1994 |
| JP | 10280907 A * | 10/1998 |

(Continued)

OTHER PUBLICATIONS

Japanese Office Action of Appln. No. 2009-150443 dated May 8, 2012 with partial English translation.

(Continued)

*Primary Examiner* — Edward Look
*Assistant Examiner* — Christopher R Legendre
(74) *Attorney, Agent, or Firm* — Antonelli, Terry, Stout & Kraus, LLP.

(57) ABSTRACT

A turbine rotor blade which is enhanced in erosion resistance and reduced in stress corrosion cracking sensitivity is provided. When a blade tip end of the turbine rotor blade is hardened by heat treatment, hardness at an outer circumferential side in a radial direction is made higher than hardness at an inner circumferential side, and thereby, enhancement in erosion resistance and reduction in stress corrosion cracking sensitivity are made compatible with each other all over in a blade length direction.

6 Claims, 5 Drawing Sheets

(56) References Cited

FOREIGN PATENT DOCUMENTS

| JP | 2002-266602 A | 9/2002 |
|---|---|---|
| JP | 2004-027261 | 1/2004 |
| JP | 2004-52673 | 2/2004 |
| JP | 2005-194626 | 7/2005 |
| JP | 2005-226539 | 8/2005 |

OTHER PUBLICATIONS

Canadian Office Action of Appln. 2,707,966 dated Nov. 26, 2012 in English.
Corrosion/Erosion Handbook by Japan Society of Corrosion Engineering, Maruzen Co., Ltd. 2000, pp. 117.
Extended European Search Report issued in European Patent Application No. 10166424.1 on Sep. 16, 2013.

* cited by examiner

TURBINE ROTOR BLADE

BACKGROUND OF THE INVENTION

The present invention relates to a turbine rotor blade having a region hardened by heat treatment at a blade tip end as an erosion shield.

In a low pressure stage of a steam turbine, the turbine rotor blade rotates at a high speed in wet steam, and therefore, the turbine rotor blade is subjected to erosion due to collision with water droplets that have condensed from the wet steam. In the regions subjected to erosion, stress concentration increases, and therefore, cracks sometimes occur from those regions.

In recent years, the blade length has tended to be made long in order to increase the output power of turbines and enhance efficiency. As the blade length increases, the circumferential velocity of the blade tip ends increase, and therefore, erosion resistance even higher than before is required.

Thus, as the measures to reduce erosion, there are known the method which bonds a cobalt alloy plate to a blade tip end by electron beam welding or silver blazing, and the measures which harden a blade tip end by heat treatment such as laser heating. In the case of hardening by heat treatment, the hardness distribution in the radial direction has not been especially considered in the prior arts (for example, refer to JP-A-2004-52673 and JP-A-54-77806).

BRIEF SUMMARY OF THE INVENTION

In the method which bonds a cobalt alloy plate to a blade tip end, the cobalt alloy is expensive, and therefore, the problem of increasing the manufacturing cost arises. The measures which harden the blade tip end by heat treatment for reduction in cost are known. However, as the material is hardened, sensitivity to stress corrosion cracking becomes higher, and there is the fear of occurrence of cracks due to stress corrosion cracking when the blades are operated for a long period of time.

An object of the present invention is to provide a turbine rotor blade which is enhanced in erosion resistance and is reduced in stress corrosion cracking sensitivity.

In the present invention, in a turbine rotor blade having a region hardened by heat treatment at a leading edge at a blade tip end portion, hardness at an outer circumferential side in a radial direction in the aforementioned hardened region is higher than the hardness at an inner circumferential side in the hardened region.

According to the present invention, when a blade tip end is hardened by heat treatment, the hardness at the outer circumferential side in the radial direction is made higher than the hardness at the inner circumferential side, and thereby, enhancement in erosion resistance strength and reduction in stress corrosion cracking sensitivity are made compatible with each other all over in the blade length direction.

More specifically, at the outer circumferential side in the radial direction, the circumferential velocity is high and the estimated erosion quantity is large, whereas the centrifugal stress is small and the possibility of stress corrosion cracking is low. Therefore, the hardness in that region is made high to give priority to enhancement in the erosion resistance. Meanwhile, at the inner circumferential side in the radial direction, the circumferential velocity is low as compared with the outer circumferential side, and such a high erosion resistance as that at the outer circumference is not required. Further, the centrifugal stress is high and the possibility of stress corrosion cracking is high as compared with at the outer circumferential side. Therefore, the hardness in that region is formed to be lower than that at the outer circumferential side to make the erosion resistance and the stress corrosion cracking sensitivity compatible with each other.

Other objects, features and advantages of the invention will become apparent from the following description of the embodiments of the invention taken in conjunction with the accompanying drawings.

BRIEF DESCRIPTION OF THE SEVERAL VIEWS OF THE DRAWINGS

FIG. 1A is a perspective view, and FIG. 1B shows a hardness distribution on an evaluation path of FIG. 1A;

FIG. 3A shows the distributions of a circumferential velocity and an erosion quantity, and FIG. 3B shows the distribution of centrifugal stress;

DETAILED DESCRIPTION OF THE INVENTION

Figure 1A:
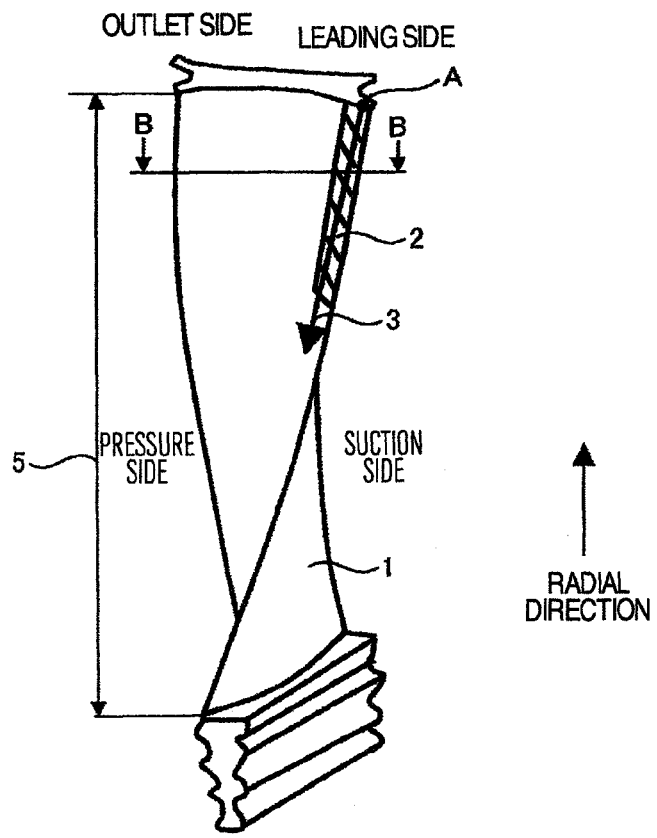
FIGS. 1A and 1B are a view and a diagram each showing an embodiment of the present invention.

Hereinafter, the present invention will be described in detail.

[Embodiment 1]

An embodiment of the present invention will be described by using FIGS. 1A and 1B. A hardened region 2 by heat treatment is included at a leading edge at a blade tip end of a turbine rotor blade 1. FIG. 1B shows the hardness distribution on an evaluation path 3 which extends to an inner circumferential side from an outer circumferential side in the radial direction shown in FIG. 1A. It is the feature of the present invention that a hardness $H_2$ at the outer circumferential side is formed to be higher than a hardness $H_1$ at the inner circumferential side in the hardened region 2 by heat treatment. In the present embodiment, in the hardened region, the hardness is formed to be smoothly reduced from the outer circumferential side to the inner circumferential side. The hardness $H_1$ at the inner circumferential side of the hardened region is formed to be higher than a hardness $H_0$ of the base material.

The hardness of the region with a high hardness at the outer circumferential side is desirably 400 HV or higher in Vickers hardness. A hardness difference $(H_2-H_1)$ of the high-hardness region and the low-hardness region is desirably at least 30 HV. A length L in the radial direction of the hardened region by heat treatment depends on the blade length, rotational speed and wetness, but is desirably about 20 to 40% with respect to a blade effective length 5.

Figure 1B:
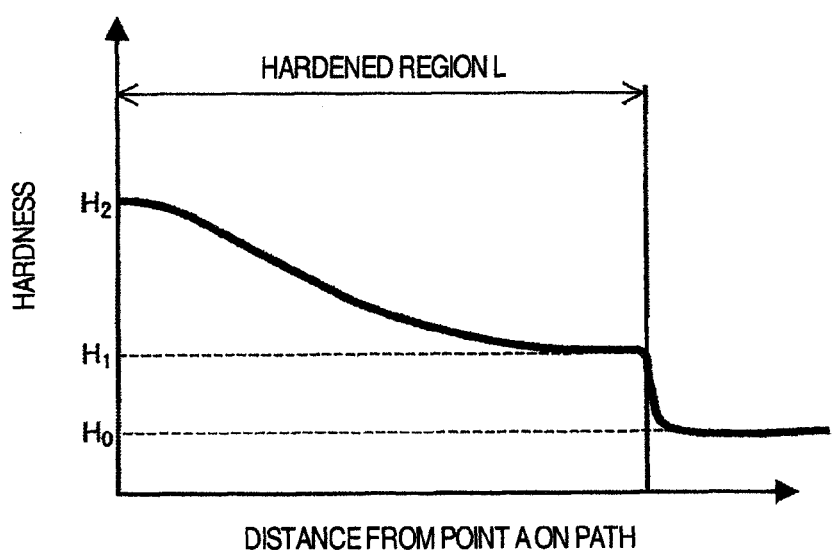
Figure 2:
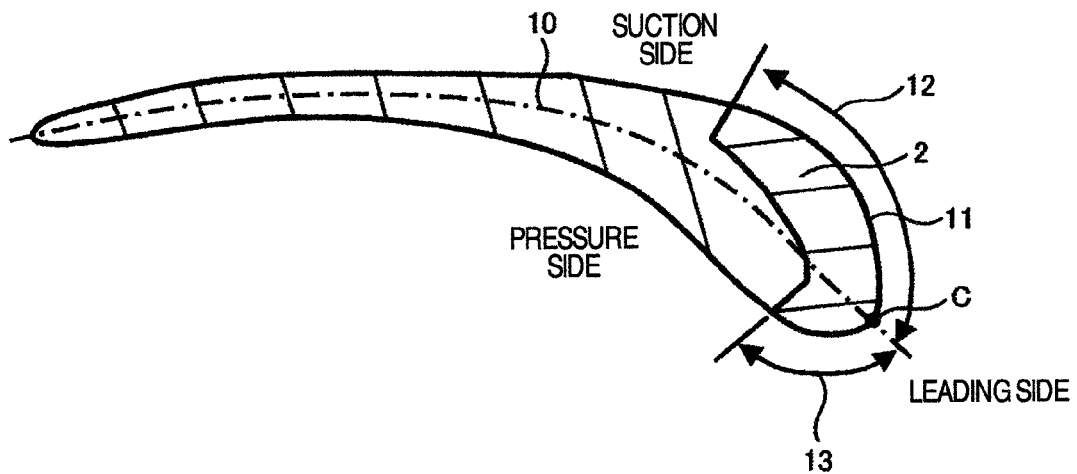
FIG. 2 is a sectional view taken along the line B-B of FIG. 1A.

FIG. 2 shows a sectional view taken along the line B-B of FIG. 1A. As shown in FIG. 2, a length 12 of the hardened region at a blade suction side from an intersection point C of a camber line 10 and an outline 11 of the profile at the blade leading edge is formed to be longer than a hardened region length 13 at a pressure side from the aforementioned intersection point C. This is the measure based on the assumption that an erosion quantity becomes larger at the suction side than at the pressure side. By adopting the present structure, the erosion quantity can be reduced efficiently by minimum work of the hardened region, which results in cost reduction.

The effect according to the present invention will be described hereinafter by using tests and analysis results.

Figure 3A:
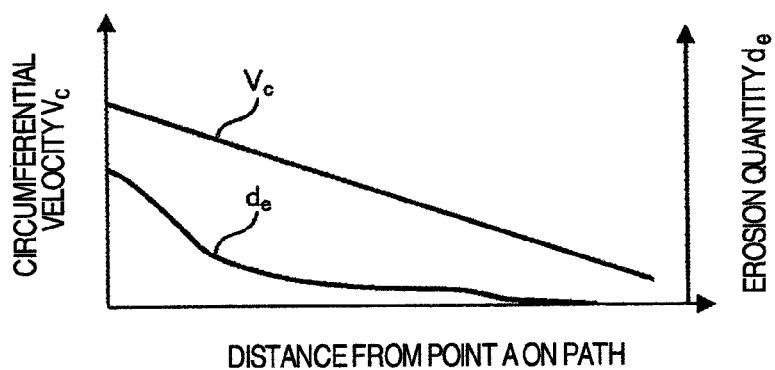
FIGS. 3A and 3B are explanatory diagrams showing the distributions of the respective physical quantities on the evaluation path of FIG. 1A.
Figure 3B:
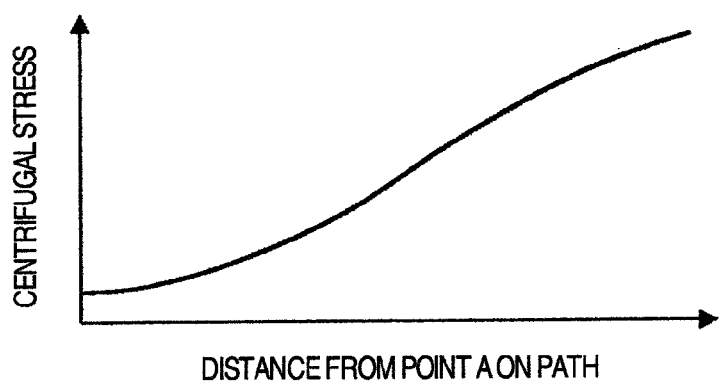

FIG. 3A shows the distribution of a circumferential velocity $V_c$ of the turbine blade and the distribution of an estimated erosion quantity $d_e$ on the radial evaluation path 3 of FIG. 1A. The circumferential velocity of the turbine blade becomes higher toward the outer circumference in the radial direction, and with this, the erosion quantity tends to increase as the position is located further toward the outer circumference. FIG. 3B shows the distribution of the centrifugal stress on the same radial path. As shown in FIG. 3B, the centrifugal stress increases more as it is located further toward the inner circumferential side in the radial direction. This is because in the position located further toward the inner circumferential side, the blade volume at the outer circumferential side from that location increases, and the centrifugal force increases.

Figure 4:
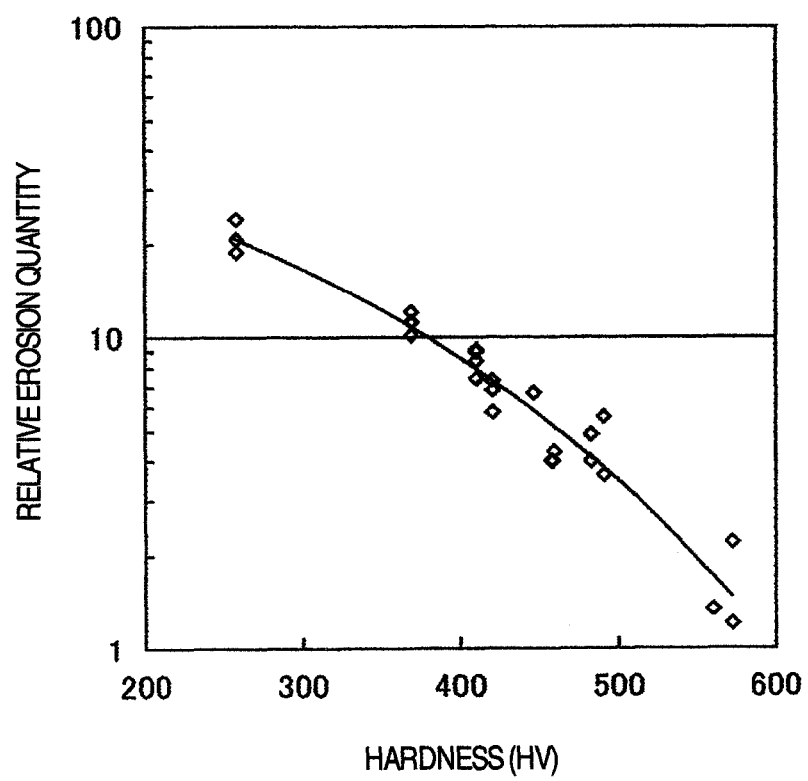
FIG. 4 is an explanatory diagram showing the relationship of the hardness of 12Cr steel and a relative erosion quantity.

Next, about martensite 12Cr steel, the relationship of hardness and relative erosion is shown in FIG. 4. The test by water jet which simulates erosion by water droplets in the low-pressure stage of the steam turbine was carried out. According to the test, it is found out that the relative erosion quantity of 12Cr steel has obvious correlation with the hardness and as the hardness increases, the erosion quantity reduces.

Figure 5:
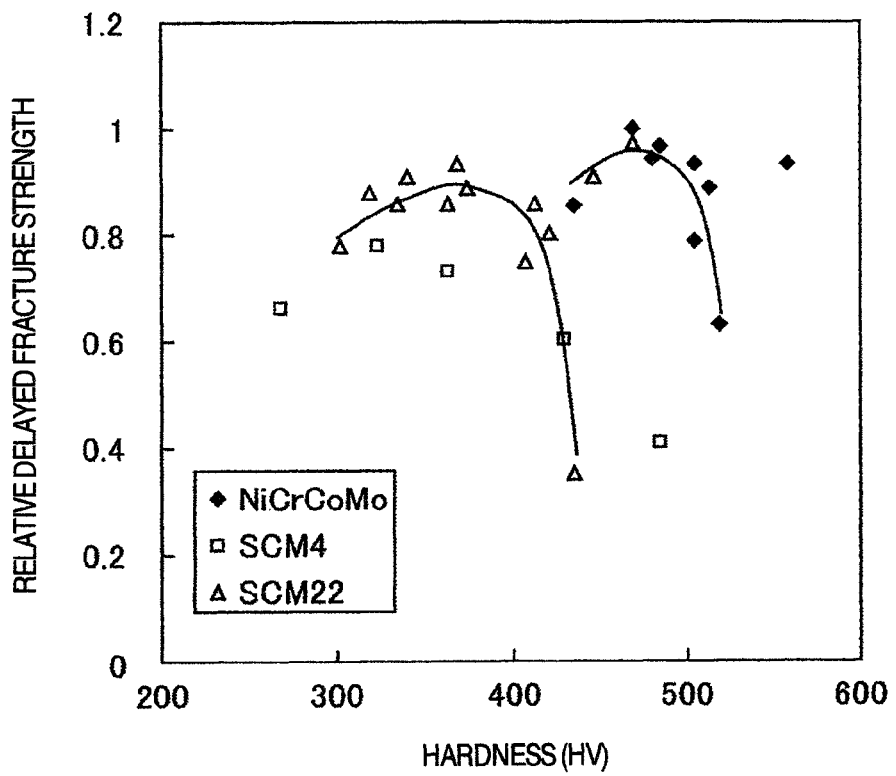
FIG. 5 is an explanatory diagram showing the relationship of the hardness of Cr steel and relative delayed fracture strength.

The relationship of the hardness and the delayed fracture strength of various Cr steels is shown in FIG. 5. The present diagram is a diagram which is the organized result of conversion of the tensile strength into Vickers hardness from the data of the document (source: CORROSION/EROSION HANDBOOK by JAPAN SOCIETY OF CORROSION ENGINEERING, MARUZEN CO., LTD., (2000), p. 117). Here, the delayed fracture and stress corrosion cracking are both environment-induced cracking under tension holding stress, and on evaluation of the stress corrosion cracking strength, the delayed fracture strength shown in FIG. 5 is a good evaluation index. As shown in FIG. 5, the relationship of the hardness and the delayed fracture strength shows a complicated behavior, and is characterized in that up to a certain hardness (about 420 HV), the delayed fracture strength increases as the hardness is increased, but with a certain value as the borderline, the strength reduces, and the sensitivity to the delayed fracture increases.

Summing up the above described matter, when the blade tip end of the steam turbine blade is hardened by heat treatment as an erosion shield, at the outer circumferential side in the radial direction, the circumferential velocity is high and the estimated erosion quantity is large, while the centrifugal stress is small and the possibility of stress corrosion cracking is small. Therefore, priority is given to enhancement in erosion resistance by increasing the hardness in that region. Meanwhile, at the inner circumferential side in the radial direction, the circumferential velocity is low as compared with the outer circumferential side, and such a high erosion resistance as at the outer circumference is not required, in addition to which, the centrifugal stress is high as compared with the outer circumferential side, and the possibility of stress corrosion cracking is high. Therefore, the hardness in that region is formed to be lower than that at the outer circumferential side to be able to make the erosion resistance and the stress corrosion cracking sensitivity compatible with each other. Thus, by forming the hardness distribution in the blade length direction, enhancement in the erosion resistance and reduction in the stress corrosion cracking sensitivity can be made compatible with each other all over in the blade length direction.

Figure 6:
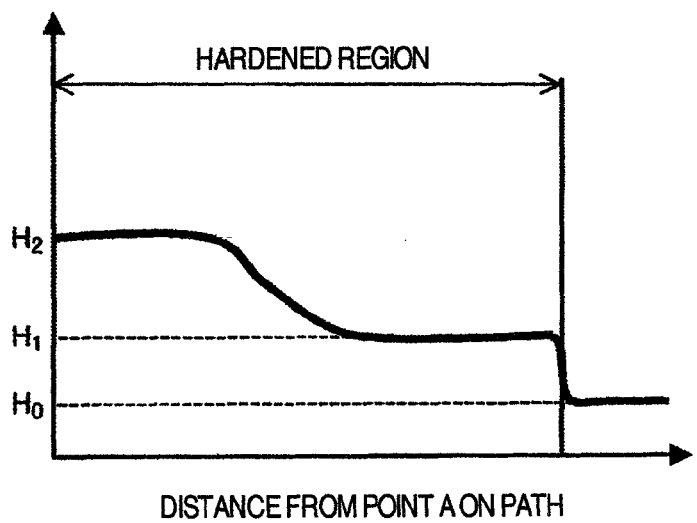
FIG. 6 is an explanatory diagram showing a hardness distribution example on the evaluation path of FIG. 1A.

The hardness distribution on the radial evaluation path 3 is not limited to the case in which the hardness smoothly reduces from the outer circumferential side to the inner circumferential side as shown in FIG. 1B, but even with the distribution having the parallel portions with the two stages as shown in FIG. 6, and the distribution form with a number of stages, the same effect as that of the present invention can be obtained.

Figure 7:
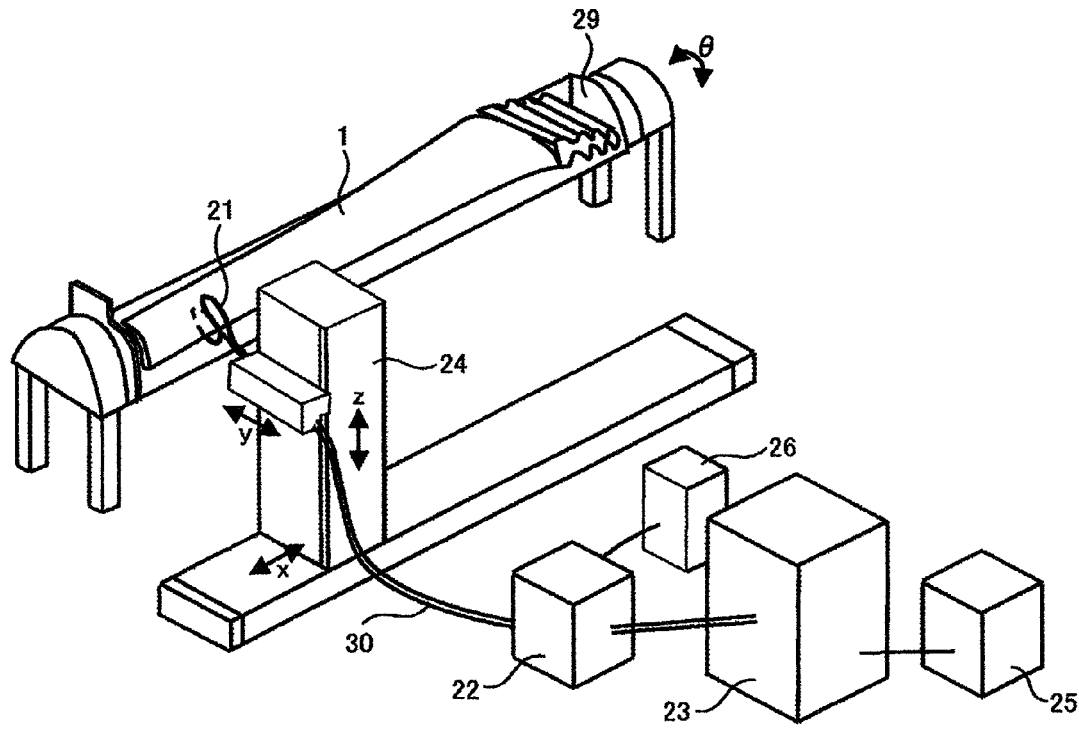
FIG. 7 is a schematic view showing a working device in the embodiment of the present invention.
Figure 8:
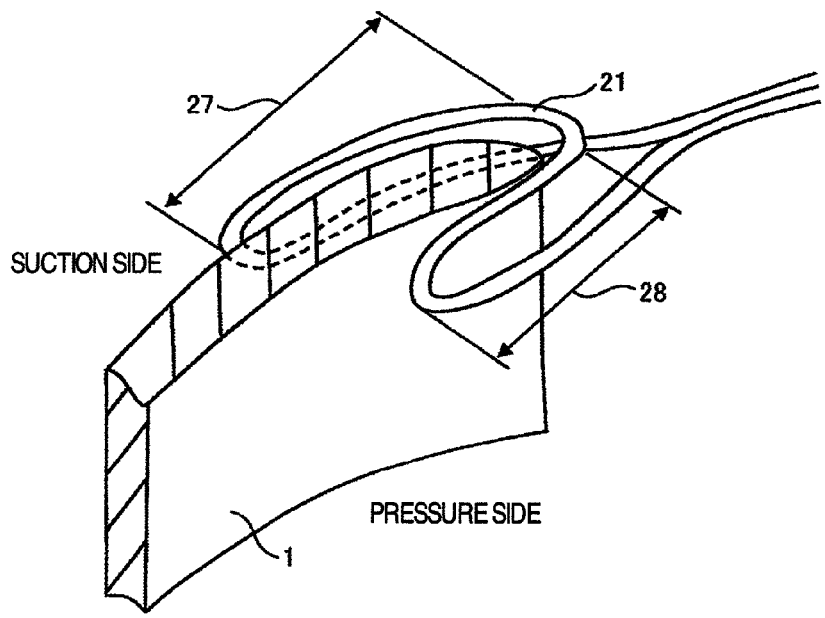
FIG. 8 is a schematic view showing a heating coil shape.

A method for performing heat treatment of the present invention by high-frequency heating will be described hereinafter. A high-frequency heating work device is constituted of a heating coil 21, a matching box 22, a high-frequency power source 23, a drive unit 24, a water-cooled chiller 25, and an output-monitoring unit 26, as shown in FIG. 7. The shape of the heating coil 21 is shown in FIG. 8. The heating coil 21 is in a U-shape, and the blade 1 which is desired to be worked is inserted therein. A coil length 27 at the blade suction side is formed to be longer than a coil length 28 at the blade pressure side, and by adopting this shape, the heat-treated region at the suction side can be made longer than that at the pressure side. The heating coil is made of copper, and has a structure which passes the cooling water from the water-cooled chiller 25 through the inside to be water-cooled.

The heating coil 21 is connected to the high-frequency power source 23 by a feeder 30 via the matching box 22. When a high-frequency AC current is passed to the coil from the high-frequency power source 23, Joule heat by an eddy current occurs to the turbine rotor blade 1 by electromagnetic induction and the turbine motor blade 1 is heated. When the frequency of the current to be passed to the coil is made high, the range in which the eddy current flows becomes the region nearer to the surface layer, and therefore, by regulating the frequency, hardening depth can be regulated. In the case of an ordinary turbine blade shape, the output of the power source is desirably 20 kW to 150 kW, and the load frequency is desirably 1 kHz to 10 kHz.

The heating coil 21 is connected to the drive unit 24, and by feeding the heating coil in a blade length direction x, work in the blade length direction becomes possible. The drive unit 24 can be position-controlled in the three-axis (x, y and z axes) directions, and a bed 29 to which the turbine blade 1 is fixed can be controlled in a rotational angle θ with the x-axis as the rotational axis. By these positional controls, induction hardening can be performed in the predetermined region for the turbine blade in a complicated shape.

When induction hardening is performed, the input current to the heating coil 21 and the feed speed in the blade length direction are controlled, and thereby, a predetermined hardness distribution can be obtained. More specifically, in order to form the hardness of the outer circumferential side to be higher than that of the inner circumferential side, which is the content of the present invention, the feed speed of the heating coil at the outer circumferential side can be made lower than that at the inner circumferential side. Further, in the control of the input current of the coil, the content of the present invention can be realized by making the current at the outer circumferential side larger than that at the inner circumferential side. The input current is desirably 50 to 200 A, and the feed speed is desirably 50 to 200 ram/min.

In order to obtain the target hardness distribution, the heating temperature by high-frequency heating is measured, by measuring the surface temperature by a contact type thermoelectric couple, or by a noncontact type radiation thermometer. The temperature is controlled by the output-monitoring unit 26 so that the measured temperature becomes a target value. There is a positive correlation between the surface temperature and the hardening hardness after the work, and therefore, if the correlation data is acquired in advance by a preliminary test, work can be performed with high precision by using the data. In martensite stainless steel, the higher the maximum temperature at the time of high-frequency heating, the higher the hardness, because as the temperature becomes higher, more carbides such as $Cr_{22}C_6$ form a solid solution, and thereby, the solid solution is reinforced.

Thus, in the work by high-frequency heating, the input current and the feed speed are controlled based on the measured temperature, and therefore, the hardness distribution and the work region can be controlled with high precision. Further, since the periphery is not directly heated, there is provided the advantage of obtaining high heating efficiency and being capable of performing work with saving of energy.

Martensite stainless steel has favorable hardenability, and can be sufficiently hardened by natural cooling without performing special cooling after high-frequency heating. In order to stabilize the structure after hardening, tempering by low temperature (150° C. to 200° C.×2 h) is desirably performed. If tempering is performed at around 300° C. to 400° C., toughness is likely to be reduced by temper embrittlement, and therefore, a sufficient care needs to be taken in temperature control. After tempering by low temperature, shot-peening can be performed to the heat-treated portion. By giving compressive residual stress by shot-peening, the effect of further reducing sensitivity to stress corrosion cracking is obtained.

The present invention is desirably applied to a martensite stainless alloy containing Cr by 10 to 15%, as a blade material. Since this material has high strength and high corrosion resistance, this material is not only suitable for the turbine blade, but sufficient hardening can be obtained by natural cooling without special forceful cooling after high-frequency heating since the material has favorable hardenability. It goes without saying that the present invention is applicable to even ferritic or precipitation-hardening stainless steel if the material can be hardened by heat treatment.

The working method by high-frequency heating is described above, but it goes without saying that a similar effect to that of the present invention also can be obtained by burner heating and laser heating.

The present invention relates to an erosion shield of a steam turbine rotor blade, and can be applied to a steam turbine or a steam turbine plant using such a steam turbine rotor blade.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A turbine rotor blade comprising in its leading edge portion of a radially outer end part of the turbine rotor blade, a region 20% to 40% of the blade radial length hardened by heat treatment, wherein a hardness at the radially outer position of the region is higher than a hardness at the radially inner position of the region, and wherein the hardness decreases continuously from the radially outer position of the region to the radially inner position of the region.

2. The turbine rotor blade according to claim 1, wherein in a cross section of the leading edge portion taken along an imaginary plane perpendicular to a longitudinal direction of the turbine rotor blade, a surface of the leading edge portion includes a suction side surface and a pressure side surface extending in respective directions opposite to each other from an intersecting point between the surface and a camber line of the leading edge portion, and a length of the region along the suction side surface is greater than a length of the region along the pressure side surface.

3. The turbine rotor blade according to claim 1, wherein the heat treatment includes an induction hardening.

4. The turbine rotor blade according to claim 1, wherein the region has a residual compressive stress generated by shot-peening.

5. The turbine rotor blade according to claim 1, wherein the turbine rotor blade is made of martensitic stainless steel including Cr of 10-15 weight percents.

6. The turbine rotor blade according to claim 1, wherein the hardness is a surface hardness.

* * * * *